United States Patent

Kurihara et al.

Patent Number: 6,027,697
Date of Patent: *Feb. 22, 2000

[54] METHOD AND APPARATUS FOR TREATING COMBUSTION EXHAUST GASES

[75] Inventors: Katsuyuki Kurihara, Chiba-ken; Mitsuyuoshi Kaneko; Keisuke Tsukamoto, both of Tokyo; Koiti Ohya, Kanagawa-ken; Hajime Kawaguchi, Tokyo; Tetsuo Msuyama, Mie-ken; Ken Shiraga, Mie-ken; Kiyoshi Kadowaki, Mie-ken; Kenichi Kiyono, Mie-ken; Kazutaka Ida, Kanagawa-ken; Yoshihiro Taki; Katsuhisa Tanaka, both of Tokyo, all of Japan

[73] Assignees: Ebara Corporation, Tokyo, Japan; Mitsubishi Chemical Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/690,825

[22] Filed: Aug. 1, 1996

[30] Foreign Application Priority Data

Aug. 8, 1995 [JP] Japan .................................. 7-221201
Jul. 23, 1996 [JP] Japan .................................. 8-210463

[51] Int. Cl.$^7$ .................................................. B01D 50/00
[52] U.S. Cl. ........................ 422/171; 422/177; 423/239.1; 423/240.5; 423/245.3
[58] Field of Search .................................... 422/177, 171, 422/239.1, 245.3, 240.5

[56] References Cited

U.S. PATENT DOCUMENTS 5,512,259   4/1996   Hagenmaier et al. ............... 423/239.1

FOREIGN PATENT DOCUMENTS 0 488 331   6/1992   European Pat. Off. .
0 547 226   6/1993   European Pat. Off. .
94 07 906   9/1994   Germany .

(List continued on next page.)

OTHER PUBLICATIONS

Toshihara Inaba et al, "15–9 Research upon the Decomposition Behavior of Organic Chlorine Compounds in Exhaust Gases ($2^{nd}$ Report)", *Lecture Papers of the $8^{th}$ Wastes Society Research Publication in 1997*, (English translation provided).

Kankyo Kanri et al, "Mechanism of the Generation of Dioxins at the Process of Combustion", vol. 33, No. 11 (1997), pp. 15–17, (English translation provided).

H. Vogg et al, "Thermal Behavior of PCDD/PCDF in Fly Ash From Municipal Incinerations", *Chemosphere*, vol. 15, Nos. 9–12, pp. 1373–1378.

Database WPI, Derwent Publications, AN 95–166508, JP–A–07 088 329, Apr. 4, 1995.

*Primary Examiner*—Timothy McMahon
*Attorney, Agent, or Firm*—Oblon, Spivak, McClelland, Maier & Neustadt, P.C.

[57] ABSTRACT

In a method for treating a combustion exhaust gas from a waste burning facility, the exhaust gas has its temperature lowered to 180–230° C., in a temperature lowering unit, is freed of dust in a dry dust collector, passed through a dioxin and NOx removing unit using a vanadium oxide-based catalyst and, thereafter, the exhaust gas at 180–230° C. is further passed through a heat exchanger to effect heat recovery. The vanadium oxide-based catalyst is a vanadium oxide alone or the combination thereof either with an oxide of at least one element selected from the group consisting of molybdenum, tin, yttrium, boron and lead or with gold. In addition, a tungsten oxide may be used. These catalysts are preferably carried on titania for use. The method and an apparatus for implementing it require a simple system configuration and yet assure high thermal efficiency while achieving efficient removal of dioxins and nitrogen oxides.

18 Claims, 4 Drawing Sheets

FOREIGN PATENT DOCUMENTS

| | | |
|---|---|---|
| 64-500330 | 2/1989 | Japan . |
| 2-35914 | 2/1990 | Japan . |
| 3-4920 | 1/1991 | Japan . |
| 4-503772 | 7/1992 | Japan . |
| 5-245343 | 9/1993 | Japan . |
| 5-337336 | 12/1993 | Japan . |
| 6-386 | 1/1994 | Japan . |
| 7-75720 | 3/1995 | Japan . |
| 7-136459 | 5/1995 | Japan . |
| 7-144117 | 6/1995 | Japan . |
| 7-280202 | 10/1995 | Japan . |
| 8-117557 | 5/1996 | Japan . |
| WO 91/04780 | 4/1991 | WIPO . |

METHOD AND APPARATUS FOR TREATING COMBUSTION EXHAUST GASES

BACKGROUND OF THE INVENTION

This invention relates to the treatment of combustion exhaust gases, more particularly, to a method and apparatus for the treatment of combustion exhaust gases, whereby dioxins and nitrogen oxides in combustion exhaust gases from waste burning boilers and combustion furnaces are treated with a catalyst at comparatively low temperatures.

Figure 3:
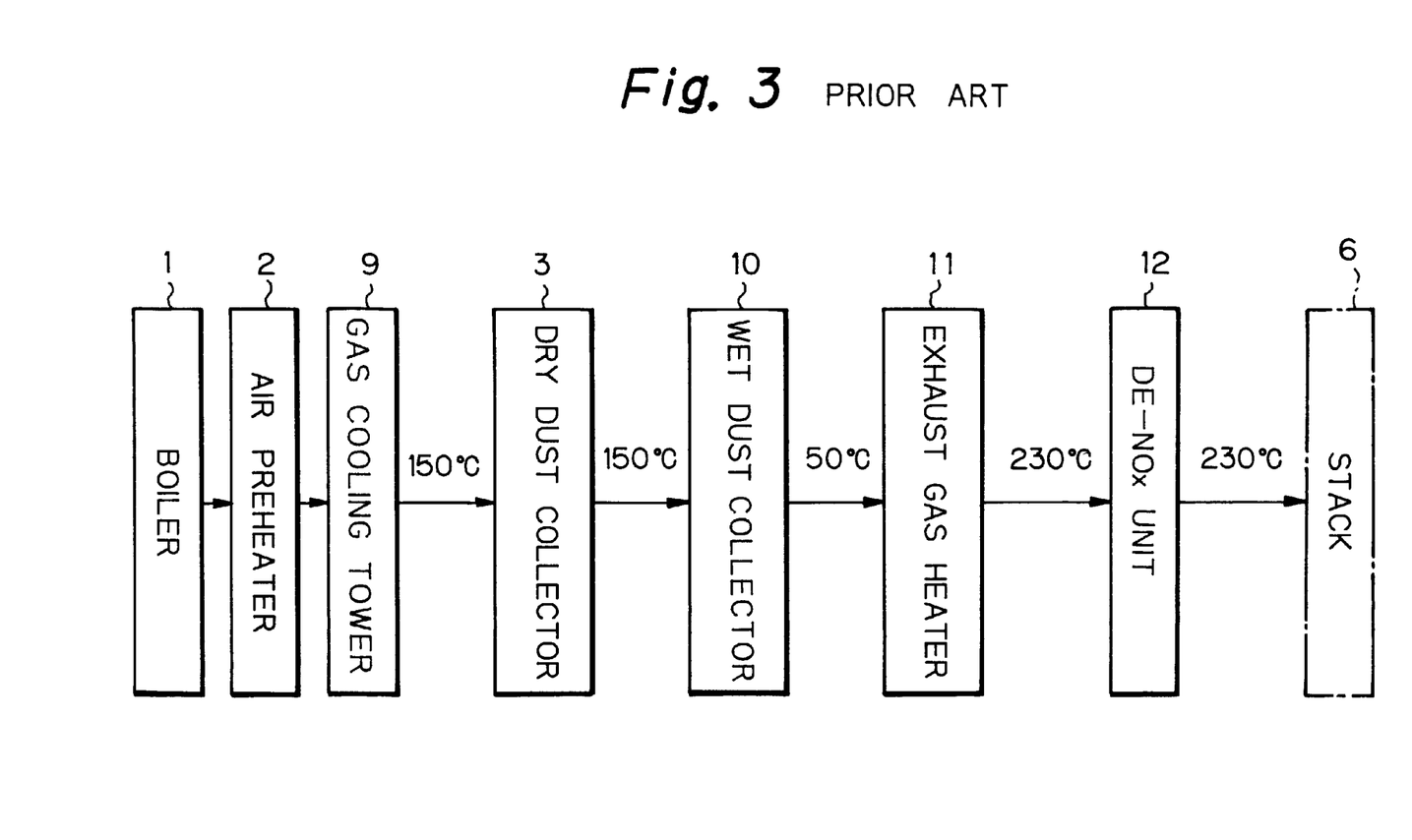
FIG. 3 is a flowchart showing the conventional method of treating combustion exhaust gases from electricity generation with wastes.
Figure 4:
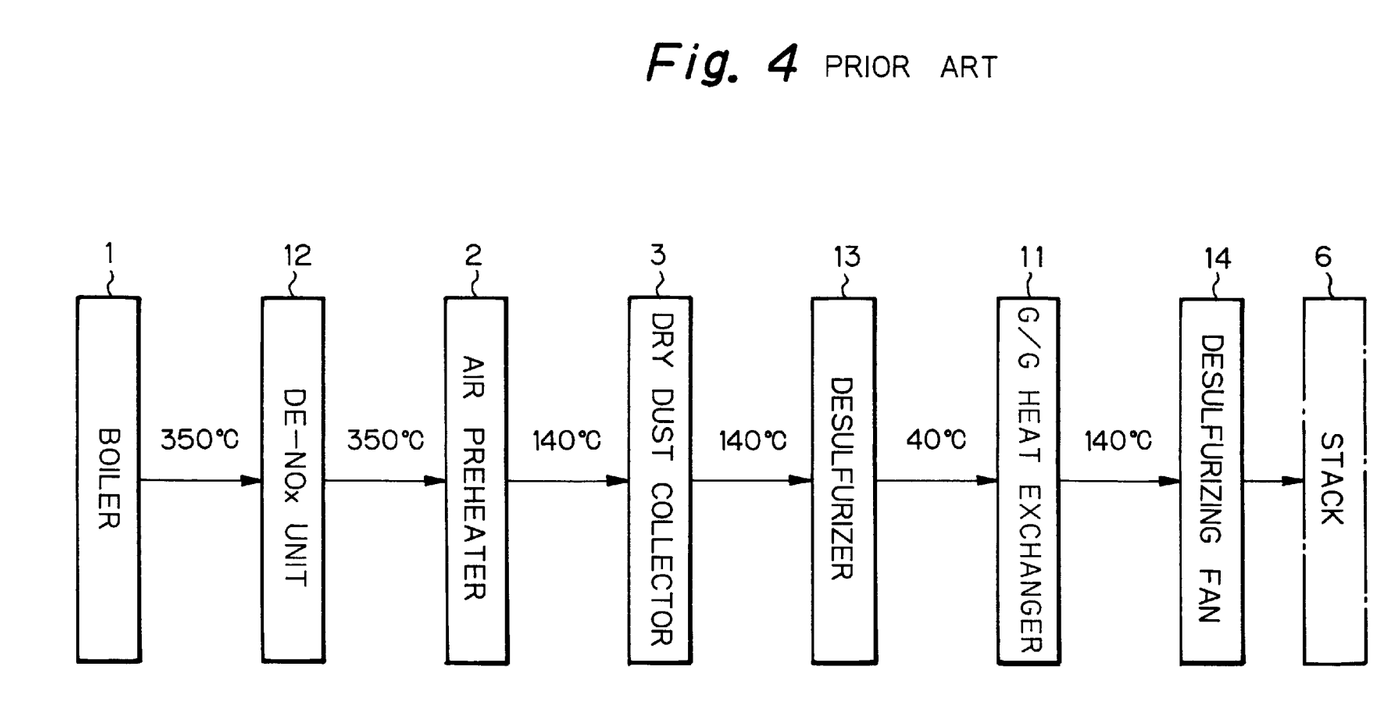
FIG. 4 is a flowchart showing the conventional method of treating combustion exhaust gases from commercial and captive thermal power generation.

A system for the conventional treatment of combustion exhaust gases from electricity generation with waste is shown schematically in FIG. 3 and a system for the treatment of combustion exhaust gases from commercial and captive thermal power generation is shown schematically in FIG. 4.

As shown in FIG. 3, the treatment of combustion exhaust gases from electricity generation with waste is chiefly intended to remove dust, heavy metals, SOx, HCl, etc. in the exhaust gases and to this end a dry dust collector (electrostatic precipitator or bag filter) 3 is connected to a downstream wet dust collector (scrubber) 10, where the combustion exhaust gas is cleaned and its temperature is lowered; thereafter, the combustion exhaust gas has its temperature elevated in an exhaust gas heater (steam heater) 11 before it is fed into a de-NOx and dioxin decomposing (catalyst) unit 12.

This prior art technology involves following problems:

(1) The number of equipments is large and the system operation becomes complicated;
(2) The construction and running costs of the facilities are high;
(3) Much labor is required for system maintenance and management services;
(4) Reheating the combustion exhaust gas after cooling in the wet dust collector reduces thermal efficiency (or plant thermal efficiency in power generation); and
(5) The efficiency of dioxin and NOx removal is low.

In the conventional treatment of combustion exhaust gases from commercial and captive thermal power generation, the fuel characteristics are constant and, therefore, as shown in FIG. 4, the de-NOx (the term "de-NOx" means "selective catalytic reduction to reduce NOx in flue gas to $N_2$) unit 12 is installed in the hot zone at the exit of the boiler 1 to achieve high de-NOx efficiency. However, even this technology involves the following problems:

(1) The temperature of the combustion exhaust gas is as high as 300–350° C., so there is a potential for the resynthesis of dioxins in a cooling process (within the air preheater 2 or other apparatus at a subsequent stage that involves the process of transition from high temperature to less than 300° C.); and
(2) The de-NOx unit 12 which is installed upstream of the dust collector 3 is liable to suffer from catalyst poisoning and contamination with dust if it is applied to waste burning boilers.

Catalytic dioxin decomposition has not heretofore been commercialized since it is low in economy, efficiency and low-temperature activity.

On the other hand, it has been known that the de-NOx catalyst is capable of decomposing dioxins although the efficiency is very low. In order to achieve high-efficiency removal of dioxins, a "two-stage" system has been adopted; as shown in FIG. 5, this system is characterized by adding slaked lime or activated carbon 7 to the combustion exhaust gas which is then passed through a bag filter 3 and a coke filter 15 successively.

Figure 5:
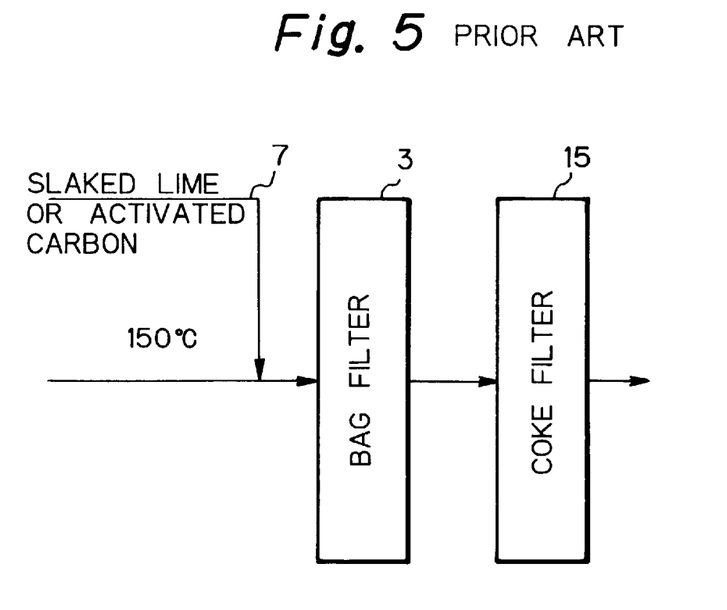
FIG. 5 is a flowchart showing the conventional method of removing dioxins from combustion exhaust gases.
Figure 6:
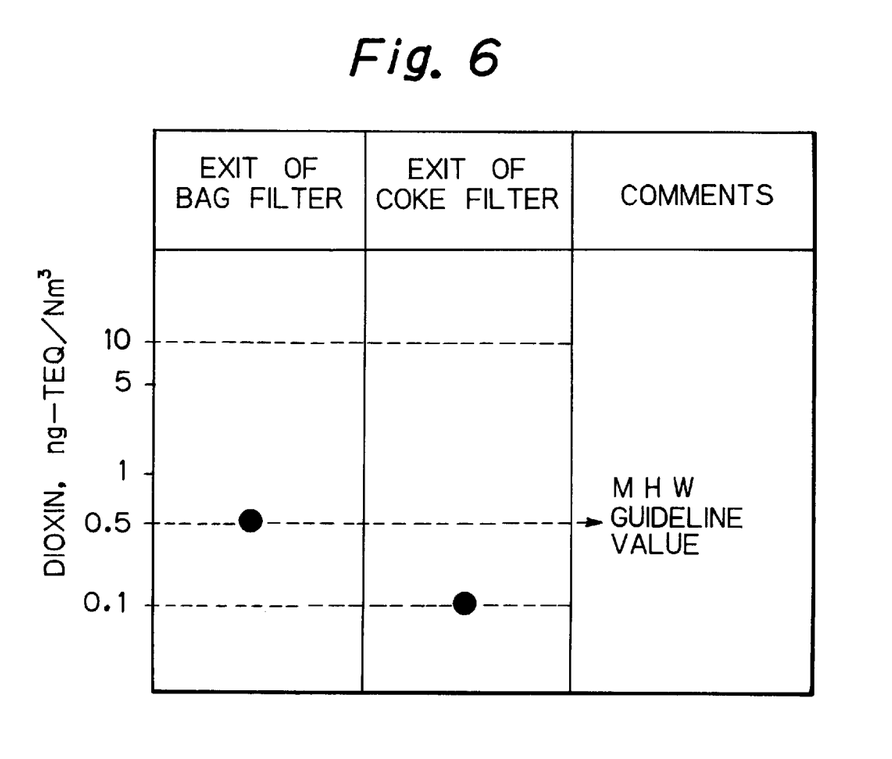
FIG. 6 is a graph showing the concentrations of dioxins in the exhaust gas treated by the method illustrated in FIG. 5.

FIG. 6 shows the result of dioxin removal using slaked lime or activated carbon in accordance with the scheme shown in FIG. 5. According to FIG. 6, an exhaust gas having a dioxin concentration of 10 ng-TEQ/Nm$^3$ (TEQ: 2,3,7,8-tetrachlorodibenzodioxin) can be treated so as to lower the dioxin concentration to 0.1 ng-TEQ/Nm$^3$. The dioxin concentration to 0.5 ng-TEQ/Nm$^3$ is the guideline value of Ministry of Health and Welfare (MHW) in Japan. Considering the characteristics of dioxins and activated carbon, the temperature of the exhaust gas should desirably be kept to 150° C. or below. In addition, the two-stage process not only involves complicated system construction but also lacks rationality from the viewpoint of energy recovery.

SUMMARY OF THE INVENTION

The present invention has been accomplished under these circumstances and has as its object the provision of a method for the treatment of combustion exhaust gases utilizing a simple system configuration and yet which assures high thermal efficiency while achieving efficient removal of dioxins and nitrogen oxides.

Another object of the invention is to provide an apparatus for implementing the method.

The first object of the invention can be attained by a method for treating a combustion exhaust gas from a waste burning facility, which comprises lowering the temperature of said exhaust gas to 180–230° C., removing dust in a dry dust collector, passing the exhaust gas through a dioxin and NOx removing unit using a vanadium oxide-based catalyst, and further allowing the exhaust gas at 180–230° C. to be passed through a heat exchanger to effect heat recovery.

The second object of the invention can be attained by an apparatus for treating a combustion exhaust gas from a waste burning facility, which comprises in cascade connection a temperature lowering unit for lowering the temperature of said exhaust gas to 180–230° C., a dry dust collector, a dioxin and NOx removing unit filled with a vanadium oxide-based catalyst, and a heat exchanger for recovering heat from the exhaust gas at 180–230° C.

In a preferred embodiment of the invention, the combustion exhaust gas is sprayed with calcium carbonate or slaked lime in the furnace or flue gas duct before it is fed into the dry dust collector such that not only part of the dioxins in the exhaust gas but also SOx, HCl, etc. are removed in the dry dust collector. As a result, the partial pressures of these substances and, hence, their dew points are reduced and the heat recovery in the heat exchanger can accordingly be increased.

The dry dust collector is preferably in the form of an electrostatic precipitator or a bag filter and the heat exchanger for recovering heat from the exhaust gas is preferably used for preliminary heating of the combustion air or process water.

MODES FOR CARRYING OUT THE INVENTION

The present invention will now be described in detail. The system layout will be apparent from the foregoing description and the examples given later in this specification, so the following description is particularly directed to the vanadium oxide-based catalyst for use in the dioxin and NOx removing unit.

A vanadium oxide or a composite catalyst based thereon is used as a catalyst for the treatment of the combustion exhaust gas (i.e., for the decomposition of dioxins and nitrogen oxides). Preferably, the vanadium oxide is used in combination either with an oxide of at least one element selected from the group consisting of molybdenum, tin, yttrium, boron and lead or with gold. Alternatively, the vanadium oxide-based catalyst may comprise (A) a vanadium oxide, (B) a tungsten oxide, and (C) either an oxide of at least one element selected from the group consisting of molybdenum, yttrium, boron, tin, and lead, or gold.

The oxide catalyst described above has particularly high resistance to poisoning with sulfur oxides. Oxide catalysts are typically used on supports such as silica, alumina, titania and diatomaceous earth, with titania ($TiO_2$) being preferred for use as the support of the catalyst to be used in the invention. The use of titania is particularly preferred if the combustion exhaust gas contains sulfur oxides.

The vanadium oxide is typically carried on the titania in an amount of 0.5–50 wt %, preferably 2–40 wt %, of the titania. If the vanadium oxide is used in combination with an oxide of at least one element selected from the group consisting of molybdenum, tin, yttrium, boron and lead, the second component is typically used in an amount of 0.1–50 wt %, preferably 0.3–40 wt %, of the titania. The weight proportion of the second component is typically at least one tenth of the vanadium oxide and does not exceed the weight of the latter. If the vanadium oxide-based catalyst on the support contains gold, the relative proportion of gold is preferably in the range from 0.001 to 20 wt % of the titania. A preferred weight ratio of gold to the vanadium oxide is typically from 0.001:1 to 0.2:1.

If the vanadium oxide-based catalyst is a composite catalyst comprising three components (A), (B) and (C), components (A) and (B) are each carried in an amount of 0.5–50 wt %, preferably 2–40 wt %, of the support and component (C) an oxide of at least one element selected from the group consisting of molybdenum, yttrium, boron, tin and lead, is typically carried in an amount of 0.1–50 wt %, preferably 0.3–40 wt %, of the support or gold is typically carried in an amount of 0.001–20 wt % of the support.

In the composite catalyst comprising components (A), (B) and (C), the tungsten oxide as component (B) is typically used in an amount 0.1–30 times, preferably 1–10 times, the weight of the vanadium oxide as component (A), and component (C) the oxide of at least one element selected from the group consisting of molybdenum, yttrium, boron, tin and lead, is typically used in an amount 0.01–3 times, preferably 0.1–1 time, the weight of the vanadium oxide as component (A).

The size and shape of the catalyst is generally determined by factors such as the characteristics of the starting materials, the presence or absence of dust, the amount of gases to be treated and the size of the reactor. The catalyst may be in a cylindrical, spherical, honeycomb-shape or plate form.

A typical method for manufacturing the catalyst on the support comprises impregnating the support with a solution of vanadium pentoxide in aqueous oxalic acid and subsequent calcinating. To manufacture a composite catalyst, an aqueous solution of compounds containing the necessary elements is mixed with the above-described aqueous solution of vanadium pentoxide and the mixture is impregnated in the support; alternatively, vanadium oxide may be first carried on the support, then an aqueous solution of the necessary compounds be impregnated and calcinated. The order in which the respective oxides are carried on the support may be reversed.

In order to manufacture a honeycomb-shaped or plate catalyst, a support component is first coated on a substrate of a desired shape and then the catalytic components are supported in the same manner as just described above. Alternatively, a support component such as titania and specified catalytic components or starting materials therefor are mixed together with a molding aid and the mixture is extruded or otherwise molded into a desired shape.

In a substrate-using catalyst such as a honeycomb-shaped catalyst, the sum of the support and catalytic components is generally 5–70 wt %, preferably 10–50 wt %, of the weight of the manufactured catalyst.

The catalyst for use in the present invention is "cold active" in that it is capable of decomposing and removing dioxins and nitrogen oxides at low temperatures of 180–230° C. which have been very difficult with the known catalysts and which eliminate the potential for dioxin resynthesis in a subsequent step. Another advantage of the catalyst is that if temperature of the combustion exhaust gas is not higher than 230° C., it only need be treated with an existing dry dust collector (bag filter) and there is no particular problem with its use even at high HCl concentrations.

In the prior art technology, the temperature of the exhaust gas at the entrance of the bag filter has to be low, desirably at 150° C. or less, in order to assure the reaction for the removal of dust, heavy metals and other deleterious substances. This is no longer the case for the present invention and the temperature of the combustion exhaust gas at the entrance of the bag filter can be elevated to the permissible level for the filter irrespective of the species of the substance to be removed from the exhaust gas.

Table 1 shows the performance of the bag filter in removing dust, a heavy metal (mercury) and a deleterious substance (hydrogen chloride) from a combustion exhaust gas at 200–230° C.

TABLE 1

|  | Concentration at entrance | Concentration at exit | Removal efficiency |
|---|---|---|---|
| Dust, g/Nm$^3$ | 1.7 | 0.0007 | 99.96% |
| Mercury, mg/Nm$^3$ | 0.023 | 0.012 | 47.8% |
| HCl, ppm | 1880 | 90 | 95.2% |

Thus, the dust, heavy metals and other deleterious substances can effectively be removed from the combustion exhaust gas even if its temperature is 230° C. or below; in addition, the temperature of the treated exhaust gas can be made higher than the current possible level by about 80° C., which is sufficient to accomplish effective energy recovery.

With the combustion exhaust gas below 230° C., not only the bag filter can be operated effectively, but also the catalyst unit provided downstream of the bag filter can attain high efficiency in removing dioxins and NOx without noticeable catalyst poisoning even if a wet dust collector (scrubber) is not installed in the upstream stage.

The following examples are provided for the purpose of further illustrating the present invention but are in no way to be taken as limiting.

Example 1

Figure 1:
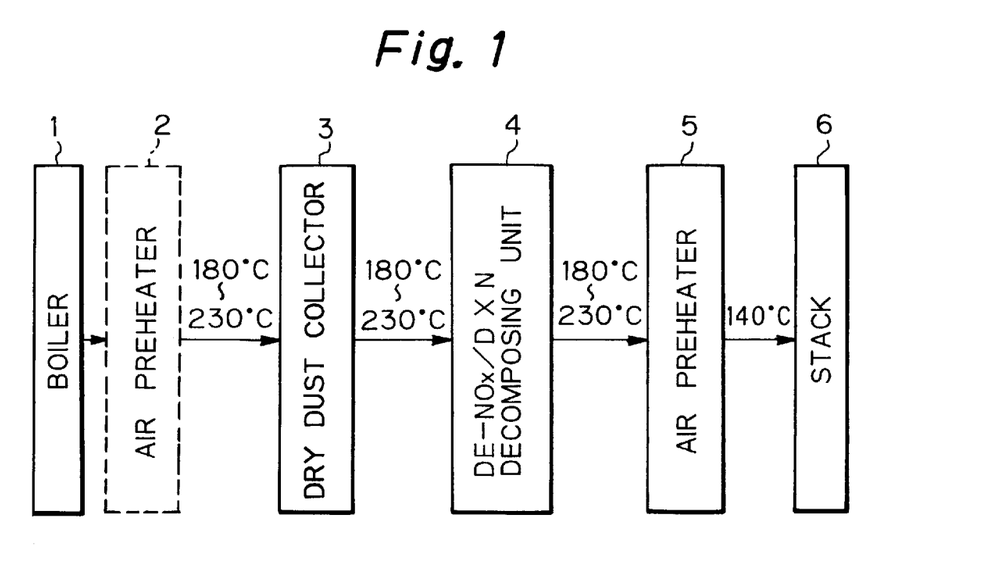
FIG. 1 is a flowchart showing an example of the invention apparatus for the treatment of combustion exhaust gases.
Figure 2:
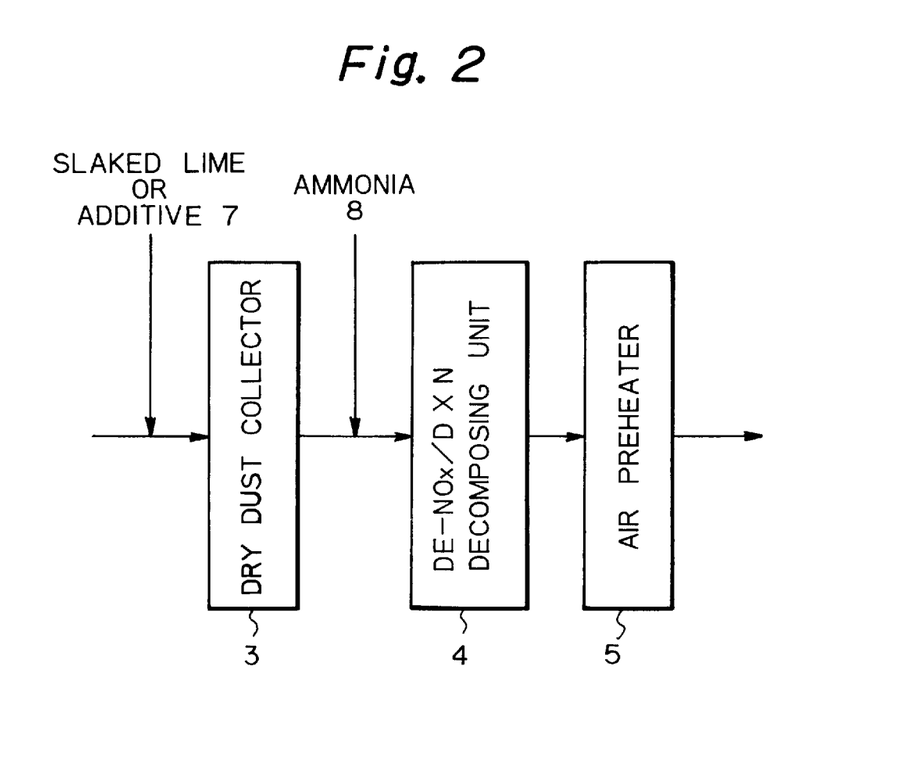
FIG. 2 is a flowchart showing the essential part of the apparatus shown in FIG. 1.

FIG. 1 is a flowchart for an example of the invention apparatus for the treatment of a combustion exhaust gas, and FIG. 2 is a flowchart for the essential part of the apparatus shown in FIG. 1.

Referring to FIG. 1, the combustion exhaust gas has its temperature lowered to 180–230° C. in a boiler 1 or air preheater 2 and it is thereafter supplied into a dry dust collector (bag filter) 3 for dust removal. The dust-removed exhaust gas at 180–230° C. is then fed into a catalyst unit 4 for simultaneous removal of dioxins and nitrogen oxides. The temperature drop that occurs in the catalytic unit 4 is solely due to the lossy heat dissipation from its surface and the exhaust gas exiting the catalytic unit 4 still retains the temperature of 180–230° C. This hot exhaust gas is therefore passed through an air preheater 5 or a process water heater for recovery of the waste heat before it is discharged from a stack 6.

The exhaust gas treatment by the invention will now be described more specifically with reference to FIG. 2. As shown, slaked lime or other suitable additive such as active carbon 7 is sprayed onto the exhaust gas before it enters the dry dust collector (bag filter) 3 in order to ensure the reaction with or adsorption of sulfur oxides, HCl and dioxins. Additionally, ammonia 8 may be sprayed onto the exhaust gas before it enters the catalytic unit 4, thereby achieving a higher de-NOx efficiency. The addition of ammonia should be small enough to prevent the formation of ammonium hydrogen sulfate at a subsequent stage.

The catalytic unit 4 is loaded with the vanadium oxide-based catalyst described herein. As the result of removal of dioxins and nitrogen oxides in the catalytic unit 4, combined with the reaction with slaked lime or active carbon, the combustion exhaust gas exiting the catalytic unit 4 is clean and free from dioxins, nitrogen oxides, HCl and sulfur oxides; yet, this clean gas is hot enough to retain a substantial amount of thermal energy. By recovering this thermal energy with the air preheater 5, the temperature of the combustion exhaust gas can be further reduced to improve the thermal efficiency. Thus, the installation of the catalytic unit 4 will not result in a lower thermal efficiency.

An experiment was conducted using the catalyst specified herein, which was manufactured in the manner described below.

(1) Preparing a Support

Titania powders (20.7 parts by weight), titania sols (32.7 parts by weight) and a 1 wt % aqueous solution of nitric acid (150 parts by weight) were charged into a ball mill and treated at 100 rpm for 24 h to prepare a titania slurry having a solids content of 16.2 wt %. A ceramic fibrous honeycomb (NICHIAS CORP.) having an effective surface area of 20.5 $cm^2/cm^3$, an open area of 73%, 205 cells per square inch and a capacity of 30 ml was immersed as a substrate in the titania slurry, into which air was blown. The immersion and air blowing were each repeated 3 times, thereby manufacturing a titania support which had a titania coating on the honeycomb substrate. The titania support was dried at 150° C. overnight and calcined at 700° C. for 3 h.

(2) Carrying a Catalyst

Vanadium pentoxide (20 g), ammonium paramolybdate (4.9 g) and oxalic acid (46 g) were dissolved in water (120 ml) to prepare an aqueous solution. The titania support manufactured in (1) was immersed in the aqueous solution for 3 h, drained, dried first at 60° C. for 5 h, then at 120° C. overnight, and calcined at 500° C. for 3 h.

The thus prepared catalyst consisted of 6.9 wt % $V_2O_5$, 1.4 wt % $MoO_3$ and 34.0 wt % $TiO_2$, with the remainder being the honeycomb substrate.

The catalyst was tested for its performance in removing dioxins and nitrogen oxides from a simulated combustion exhaust gas. The results are shown in Table 2. Referring to Table 2, experiment A was conducted at an exhaust gas temperature of 200° C. and at a SV of 3,000 $Nm^3/m^3 \cdot h$ whereas experiment B was conducted at an exhaust gas temperature of 210° C. and at a SV of 3,500 $Nm^3/m^3 \cdot h$.

TABLE 2

| Deleterious substance | Experiment A Concentration | | Experiment B Concentration | |
| --- | --- | --- | --- | --- |
|  | Entrance | Exit | Entrance | Exit |
| Dioxins, ng-TEQ/$Nm^3$ | 14.44 | 0.09 | 14.34 | 0.16 |
| Percent Removal |  | 99.4 |  | 98.9 |
| NOx, ppm | 75 | 12 | 75 | 6 |
| Percent de-NOx |  | 84.0 |  | 92.0 |
| $NH_3$, ppm | 40 | <0.2 | 41 | <0.2 |

Thus, the catalyst specified by the present invention was capable of decomposing and removing dioxins and nitrogen oxides with high efficiency.

Example 2

Catalysts were manufactured as in Example 1, except that in addition to vanadium oxide, a second component selected from among oxides of tin, yttrium, boron and lead, as well as gold was carried on the titania support. The composite catalysts thus manufactured were tested for their performance in removing dioxins and nitrogen oxides from a combustion exhaust gas at a temperature of 210° C. and at a SV of 3,500 $Nm^3/m^3 \cdot h$. The results are shown in Table 3 below.

TABLE 3

| Catalyst | Catalyst composition, wt % | | Support composition, wt % | | Percent removal of dioxins | Percent de—NOx |
| --- | --- | --- | --- | --- | --- | --- |
|  | $V_2O_5$ | Second component | $TiO_2$ | Honeycomb substrate |  |  |
| V—Sn | 5.1 | $SnO_2$ 1.7 | 43.7 | bal. | 98.0 | 95.0 |
| V—Y | 8.2 | $Y_2O_3$ 0.82 | 37.2 | bal. | 99.1 | 95.1 |
| V—B | 6.8 | $B_2O_3$ 0.68 | 37.2 | bal. | 98.2 | 97.0 |
| V—Pb | 4.8 | PbO 0.48 | 33.3 | bal. | 99.0 | 87.3 |
| V—Au | 8.5 | Au 0.5 | 37.2 | bal. | 98.5 | 99.0 |

Example 3

(1) Preparing a Catalyst

Ammonium metavanadate (19.3 g) and ammonium paratungstate (54.6 g) were dissolved in a heated (80° C.) 10 wt % aqueous monoethanolamine solution (300 g) to prepare a feed solution (A). Subsequently, yttrium nitrate hexahydrate (5.1 g) was dissolved in water (30 g) in a separate vessel to prepare another feed solution (B). The two feed solutions (A) and (B) were mixed with titania powders (435 g) by means of a two-arm kneader. The resulting mixture was fed into an extruder, from which cylinders about 3 mm in diameter and about 3–15 mm in length emerged.

The cylindrical shaped pellets were dried at 130° C. overnight and calcined at 600° C. for 3 h to yield a catalyst having the composition of V-W-Y as set forth in Table 4.

(2) Activity Test

A glass reactor having an inside diameter of 43 mm was loaded with 30 cc of the catalyst V-W-Y and its performance in removing dioxins and nitrogen oxides from a simulated combustion exhaust gas was tested as in Example 2, with the exhaust gas temperature and the SV were 200° C. and 5,000 $Nm^3/m^3 \cdot h$, respectively. The results are also shown in Table 4.

Examples 4 and 5

Two additional catalysts, V-W-B and V-W-Pb, were prepared as in Example 3, except that 5.1 g of yttrium nitrate hexahydrate was replaced by 5.3 g of boric acid (Example 4) or 4.5 g of lead nitrate (Example 5). These catalysts were tested for their activity as in Example 3. The composition of each catalyst and the result of evaluation of its performance are shown in Table 4.

Example 6

Another catalyst, V-W-Sn, was prepared as in Example 3, except that feed solution (B) was replaced by a feed solution having tin (II) chloride dihydrate (4.5 g) dissolved in 1 wt % HCl (30 g). This catalyst was tested for its activity as in Example 3. The composition of the catalyst and the result of evaluation of its performance are shown in Table 4.

TABLE 4

| Catalyst | Catalyst composition, wt % | | | | Support wt % $TiO_2$ | Percent removal of dioxins | Percent de-NOx |
|---|---|---|---|---|---|---|---|
| | $V_2O_5$ | $WO_3$ | Third component | | | | |
| V—W—Y | 3 | 9.7 | $Y_2O_3$ | 0.3 | 87.0 | 98.2 | 93.1 |
| V—W—B | 3 | 9.7 | $B_2O_3$ | 0.6 | 86.7 | 95.4 | 92.0 |
| V—W—Pb | 3 | 9.7 | PbO | 0.6 | 86.7 | 97.4 | 90.5 |
| V—W—Sn | 3 | 9.7 | $SnO_2$ | 0.6 | 86.7 | 98.6 | 94.7 |

Example 7

An additional catalyst (V-W-Y) was prepared as in Example 3, except that it was composed of honeycombs as in Example 1, (1) rather than cylinders with a diameter of 3 mm. The catalyst was used to treat a simulated combustion exhaust gas as in Example 1.

The test apparatus was of the same type as used in Example 1 to evaluate catalyst activity. The simulated gas contained dioxins in an amount of 48.5 $ng-TEQ/Nm^3$ and nitrogen oxides (NOx) in an amount of 75 ppm. With ammonia (75 ppm) being added, the gas was passed through the catalyst bed at a temperature of 200° C. and at a SV of 3,000 $Nm^3/m^3 \cdot h$, whereby the dioxins and NOx in the gas were decomposed continuously. The treated exhaust gas was analyzed as in Example 3.

The dioxin and NOx contents of the exhaust gas before and after the treatment, as well as the percent decompositions of the respective deleterious substances are shown in Table 5 below.

TABLE 5

| | Concentration | |
|---|---|---|
| Deleterious substance | Entrance | Exit |
| Dioxin, $ng-TEQ/Nm^3$ | 48.5 | 2.26 |
| Percent removal | | 95.2 |
| NOx, ppm | 75 | 7 |
| Percent de-NOx | | 90.7 |
| $NH_3$, ppm | 75 | <0.2 |

The present invention offers the following advantages.

(1) The temperature of the combustion exhaust gas exiting the dioxin and NOx decomposing catalyst unit is lower than the temperature for the resynthesis of dioxins, thereby eliminating the potential for dioxin resynthesis.

(2) Since the catalyst unit is installed downstream of the dust collector, the catalyst will be neither poisoned nor contaminated and it will suffer from only small pressure loss, with the added advantage of a longer service life.

(3) System operation of the whole equipment can be easily accomplished.

(4) The construction and running costs of the equipment are low.

(5) Only limited labor is required for system maintenance and management services.

(6) The combustion exhaust gas need not be heated at intermediate stages and this ensures high thermal efficiency (or plant thermal efficiency in power generation).

(7) The catalyst in the dioxin and NOx decomposing unit has high activity even at low temperatures and this ensures high efficiency in de-NOx and removal of dioxins.

Because of these advantages, the present invention reduces environmental pollution associated with electricity generation with waste which emits combustion exhaust gases that contain large amounts of nitrogen oxides and that can potentially produce dioxins. In addition, the thermal efficiency of the facility can be sufficiently enhanced to reduce carbon dioxide ($CO_2$) in the exhaust gas which is considered to be a major factor in global warming.

What is claimed is:

1. A method for treating a combustion exhaust gas from a waste burning facility, which comprises:

lowering the temperature of said exhaust gas to 180–230° C.;

removing dust from the exhaust gas in a dry dust collector;

passing the exhaust gas over a vanadium oxide-based catalyst which is a combination of a vanadium oxide with an oxide of at least one element selected from the group consisting of yttrium, boron and lead in a dioxin and $NO_x$ removing unit to decompose both dioxin and $NO_x$ in one step at 180–230° C.; and then passing the treated exhaust gas having a temperature of 180–230° C. through a heat exchanger to effect heat recovery, so that resynthesis of dioxin is inhibited and exhaust gas containing-substantially no dioxin and $NO_x$ is provided.

2. The method of claim 1, wherein said vanadium oxide-based catalyst is supported on titania, with the vanadium oxide being supported in an amount of 0.5–50 wt. % of the titania, the oxide of at least one element selected from the group consisting of yttrium, boron, and lead being supported in an amount of 0.1–50 wt. % of the titania.

3. A method for treating a combustion exhaust gas from a waste burning facility, which comprises:

lowering the temperature of said exhaust gas to 180–230° C.;

removing dust from the exhaust gas in a dry dust collector;

passing the exhaust gas over a vanadium oxide-based catalyst which comprises:
(A) a vanadium oxide;
(B) a tungsten oxide; and
(C) an oxide of at least one element selected from the group consisting of yttrium, boron, and lead in a dioxin and $NO_x$ removing unit to decompose both dioxin and $No_x$ in one step at 180–230° C.; and then passing the treated exhaust gas having a temperature of 180–230° C. through a heat exchanger to effect heat recovery, so that resynthesis of dioxin is inhibited and exhaust gas containing substantially no dioxin and $NO_x$ is provided.

4. The method of claim 3, wherein said vanadium oxide-based catalyst is supported on titania, with components (A), (B) and (C), as the oxides, being supported in respective amounts of 0.5–50 wt. %, 0.5–50 wt % and 0.001–20 wt. % of the titania.

5. The method of claim 3, wherein component (B) of the catalyst is present in an amount of 0.1–30 times the weight of component (A).

6. The method of claim 4, wherein component (B) of the catalyst is present in an amount of 0.1–30 times the weight of component (A).

7. The method of claim 1, wherein the combustion exhaust gas to be freed of dust in said dry dust collector is sprayed with calcium carbonate and/or slaked lime.

8. An apparatus for treating a combustion exhaust gas from a waste burning facility, which comprises:

in cascade connection a temperature lowering unit for lowering the temperature of said exhaust gas to 180–230° C.;

a dry dust collector;

a dioxin and $NO_x$ removing unit filled with a vanadium oxide-based catalyst which is a combination of vanadium oxide either with an oxide of at least one element selected from the group consisting of yttrium, boron and lead in which both dioxin and $NO_x$ are decomposed in one step at 180–230° C.; and a heat exchanger for recovering heat from the exhaust gas at 180–230° C., in order in order to inhibit resynthesis of dioxin thereby providing an exhaust gas containing substantially no dioxin.

9. The apparatus of claim 8, wherein said dry dust collector is an electrostatic precipitator or a bag filter.

10. An apparatus for treating a combustion exhaust gas from a waste burning facility, which comprises:

in cascade connection a temperature lowering unit for lowering the temperature of said exhaust gas to 180–230° C.;

a dry dust collector;

a dioxin and $NO_x$ removing unit filled with a vanadium oxide-based catalyst which comprises:
(A) a vanadium oxide;
(B) a tungsten oxide; and
(C) an oxide of at least one element selected from the group consisting of yttrium, boron, and lead in which both dioxin and $NO_x$ are decomposed in one step at 180–230° C.; and a heat exchanger for recovering heat from the treated exhaust gas having a temperature of 180–230° C., in order to inhibit resynthesis of dioxin thereby providing an exhaust gas containing substantially no dioxin.

11. The apparatus of claim 8, wherein said vanadium oxide-based catalyst is supported on titania, with the vanadium oxide being supported in an amount of 0.5–50 wt. % of the titania, the oxide of at least one element selected from the group consisting of yttrium, boron, and lead being supported in an amount of 0.1–50 wt. % of the titania.

12. The apparatus of claim 10, wherein said vanadium oxide-based catalyst is supported on titania, with components (A), (B) and (C), as the oxides, being supported in respective amounts of 0.5–50 wt. %, 0.5–50 wt % and 0.001–20 wt. % of the titania.

13. The apparatus of claim 10, wherein component (B) of the catalyst is present in an amount of 0.1–30 times the weight of component (A).

14. The method of claim 12, wherein component (B) of the catalyst is present in an amount of 0.1–30 times the weight of component (A).

15. A method for treating a combustion exhaust gas from a waste burning facility, which comprises:

lowering the temperature of said exhaust gas to 180–230° C.;

removing dust from the exhaust gas in a dry dust collector;

passing the exhaust gas over a vanadium oxide-based catalyst which is a combination of a vanadium oxide with yttrium or yttrium oxide in a dioxin and $NO_x$ removing unit to decompose both dioxin and $NO_x$ in one step at 180–230° C.; and then passing the treated exhaust gas having a temperature of 180–230° C. through a heat exchanger to effect heat recovery, so that resynthesis of dioxin is inhibited and exhaust gas containing-substantially no dioxin and $NO_x$ is provided.

16. A method for treating a combustion exhaust gas from a waste burning facility, which comprises:

lowering the temperature of said exhaust gas to 180–230° C.;

removing dust from the exhaust gas in a dry dust collector;

passing the exhaust gas over a vanadium oxide-based catalyst which comprises:
(A) a vanadium oxide;
(B) a tungsten oxide; and
(C) yttrium or yttrium oxide in a dioxin and $NO_x$ removing unit to decompose both dioxin and $NO_x$ in one step at 180–230° C.; and then passing the treated exhaust gas having a temperature of 180–230° C. through a heat exchanger to effect heat recovery, so that resynthesis of dioxin is inhibited and exhaust gas containing substantially no dioxin and $NO_x$ is provided.

17. An apparatus for treating a combustion exhaust gas from a waste burning facility, which comprises:

in cascade connection a temperature lowering unit for lowering the temperature of said exhaust gas to 180–230° C.;

a dry dust collector;

a dioxin and $NO_x$ removing unit filled with a vanadium oxide-based catalyst which is a combination of vanadium oxide with yttrium or yttrium oxide, in which both dioxin and $NO_x$ are decomposed in one step at 180–230° C.; and a heat exchanger for recovering heat from the exhaust gas at 180–230° C., in order in order to inhibit resynthesis of dioxin thereby providing an exhaust gas containing substantially no dioxin.

18. An apparatus for treating a combustion exhaust gas from a waste burning facility, which comprises:

in cascade connection a temperature lowering unit for lowering the temperature of said exhaust gas to 180–230° C.;

a dry dust collector;

a dioxin and $NO_x$ removing unit filled with a vanadium oxide-based catalyst which comprises:

(A) a vanadium oxide;

(B) a tungsten oxide; and (C) yttrium or yttrium oxide, in which both dioxin and $NO_x$ are decomposed in one step at 180–230° C.; and a heat exchanger for recovering heat from the treated exhaust gas having a temperature of 180–230° C., in order to inhibit resynthesis of dioxin thereby providing an exhaust gas containing substantially no dioxin.

* * * * *

UNITED STATES PATENT AND TRADEMARK OFFICE
CERTIFICATE OF CORRECTION

PATENT NO. : 6,027,697
DATED : February 22, 2000
INVENTOR(S): Katsuyuki KURIHARA et al.

It is certified that an error appears in the above-identified patent and that said Letters Patent is hereby corrected as shown below:

On the title page, item [75], the 2nd and 6th Inventors' names misspelled. The inventors should read as follows:

--[75] Inventors: Katsuyuki Kurihara, Chiba-ken; Mitsuyoshi Kaneko; Keisuke Tsukamoto, both of Tokyo; Koiti Ohya, Kanagawa-ken; Hajime Kawaguchi, Tokyo; Tetsuo Masuyama, Mie-ken; Ken Shiraga, Mie-ken; Kiyoshi Kadowaki, Mie-ken; Kenichi Kiyono, Mie-ken; Kazutaka Ida, Kanagawa-ken; Yoshihiro Taki; Katsuhisa Tanaka, both of Tokyo, all of Japan--

On the title page, item [30] is incorrectly listed. It should read as follows:

--[30] Foreign Application Priority Data

Aug. 8, 1995 [JP] Japan............7-221204
Jul. 23, 1996 [JP] Japan............8-210463--

Signed and Sealed this

Twenty-seventh Day of March, 2001

Attest:

NICHOLAS P. GODICI

Attesting Officer

*Acting Director of the United States Patent and Trademark Office*